(12) United States Patent
Johnson

(10) Patent No.: US 10,406,965 B1
(45) Date of Patent: Sep. 10, 2019

(54) STRAP THROWER FOR LARGE LOADS

(71) Applicant: David Johnson, Fergus Falls, MN (US)

(72) Inventor: David Johnson, Fergus Falls, MN (US)

(*) Notice: Subject to any disclaimer, the term of this patent is extended or adjusted under 35 U.S.C. 154(b) by 0 days.

(21) Appl. No.: 16/164,511

(22) Filed: Oct. 18, 2018

(51) Int. Cl.
*B60P 7/08* (2006.01)
*B25J 1/04* (2006.01)

(52) U.S. Cl.
CPC .............. *B60P 7/0853* (2013.01); *B25J 1/04* (2013.01); *B60P 7/0846* (2013.01)

(58) Field of Classification Search
CPC ......... B60P 7/0853; B60P 7/0846; B25J 1/04; A63B 59/20; A63B 65/122
USPC .......................... 294/209–211; 410/98; 124/5
See application file for complete search history.

(56) References Cited

U.S. PATENT DOCUMENTS

| | | | |
|---|---|---|---|
| 5,290,039 A * | 3/1994 | Cornelio | A63B 60/06 473/513 |
| D525,326 S * | 7/2006 | Green | D21/722 |
| 7,393,031 B2 * | 7/2008 | Goulet | B60P 7/0853 294/210 |
| 9,126,521 B1 * | 9/2015 | McCullough | B60P 7/083 |
| 2006/0229136 A1 * | 10/2006 | Presley | A63B 63/00 473/157 |
| 2008/0178440 A1 * | 7/2008 | Douglas | B60P 7/0853 24/68 CD |
| 2008/0314372 A1 * | 12/2008 | Guindon | B60P 7/0853 124/5 |
| 2010/0028100 A1 * | 2/2010 | Lampman | B60P 7/0853 410/156 |
| 2015/0047621 A1 * | 2/2015 | Palladino | A63B 65/122 124/5 |
| 2017/0258047 A1 * | 9/2017 | Wills | A01K 15/027 |
| 2018/0326894 A1 * | 11/2018 | Abood | B60P 7/0853 |

* cited by examiner

*Primary Examiner* — Dean J Kramer
(74) *Attorney, Agent, or Firm* — Law Office of Scott C Harris, Inc

(57) ABSTRACT

A strap holding and placement system that propels a rolled up strap over a load such as a truck bed. A handle attaches to a strap part that holds a rolled up strap. The strap part has multiple surfaces for holding the rolled strap. The multiple surfaces include a first rounded portion, which holds only a portion of the rolled strap, and a second curved portion above the rounded portion, which enables the strap to be propelled from the strap part from an area near a distal end of the strap part, when the handle is moved to propel the strap. The strap is held below the level of the front surface, in a rounded surface that is recessed below the front.

6 Claims, 5 Drawing Sheets

STRAP THROWER FOR LARGE LOADS

BACKGROUND

Trucks with large loads have conventionally used straps that are extended over the load at intervals, e.g, intervals of a few feet. The straps attach to the bed of the truck on one side, are thrown over the load, and attached to the bed of the truck on the other side.

In order to place the straps, a driver or loader stands on one side with the straps, and has conventionally thrown them over the load. Conventionally, this has used four-inch straps, although this can be used with other size straps, including 1 inch, 2 inches, 3 inches, 5 inches or 6 inches. The straps need to be strapped into a straight line over the load. Conventionally, this has been done by throwing the straps over the loads. However, the loads can be large, e.g., 8 to 20 feet tall and 8 to 16 feet long. Moreover, the straps are heavy, and the loads themselves are lifted on a tractor bucket, making it even more difficult to get the straps over the loads.

This requires the packer to throw the strap a long distance to get the strap over the load; or to get on a ladder and propel the straps over the loads in that way. The straps need to be placed every few feet. This requires large amounts of effort from the packer. Also, the extreme efforts to throw these straps can lead to injuries, including strained arms and muscles.

SUMMARY

The present application describes a special strap thrower, intended for assisting a driver or loader in securing a strap over a large and tall load on a truck bed.

In an embodiment, the strap thrower includes a pole with a special strap throwing part at the end of the pole. The strap throwing part is specially adapted to hold a rolled up strap. The strap part is loaded with the strap, and one side of the strap is attached to one side of the truck. Then, the rolled part of the strap is placed into the strap holding part, which is extended, and then thrown over the load to the other side.

In an embodiment, a strap throwing part attached to the end of a pole, where the strap throwing part holds the rolled up strap and propels the strap when it is thrown, while maintaining a guide for the sides of the strap in registration with sides of the strap throwing part until the strap leaves the confines of the strap throwing part.

DETAILED DESCRIPTION

Embodiments are as described herein.

Figure 1:
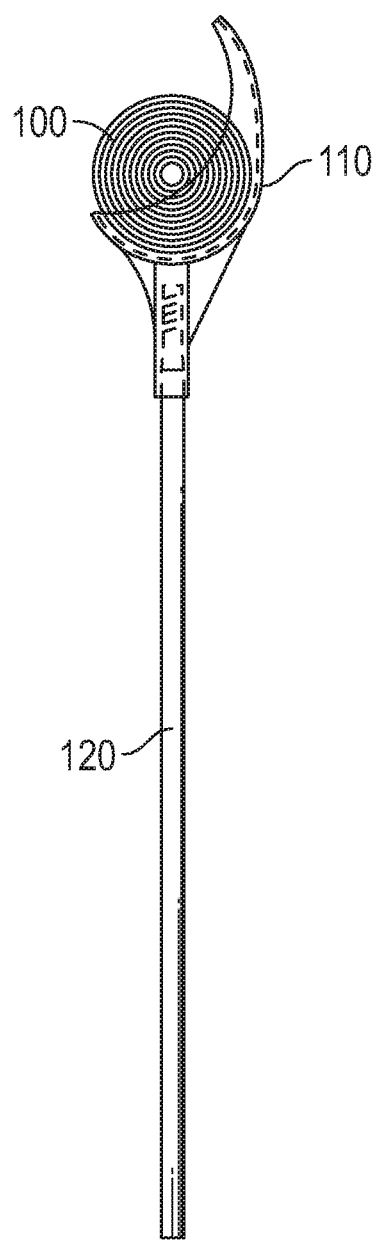
FIG. 1 shows the pole and strap throwing part and the rolled up strap.

The present invention describes a unique way of throwing straps on a truck over a long load. In an embodiment, a strap, having a clip at both ends and the ability to tighten (e.g., by ratcheting) is used. FIG. 1 illustrates the overall device including the strap 100 stored in a rolled up fashion inside the strap throwing part 110. The strap throwing part is attached to a pole 120 which can be for example a 36 to 54 inch pole with one end threaded. In one embodiment, the strap that is used can be a standard 4 inch wide strap rolled to form a 7 inch diameter rolled disk. The strap 100 may be 10 to 20 feet long in different embodiments.

The bulk of the strap is rolled into the disk shape that is held within the strap throwing part 110.

Figure 2:
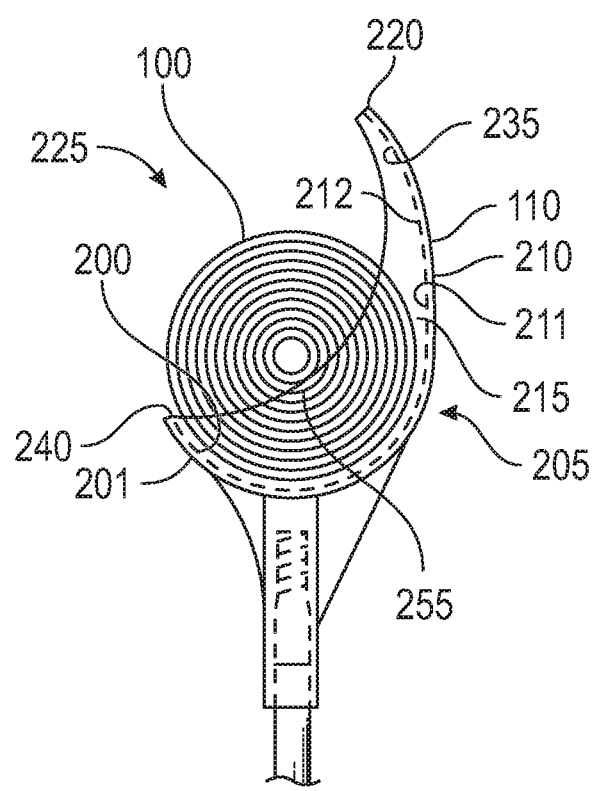
FIG. 2 shows a closeup of the strap throwing part, showing the way that the rolled up strap fits into the strap throwing part.

FIG. 2 shows a close up of the strap throwing part 110. The part 110 includes a curved bottom portion 201 which curves in basically the shape of a semicircular arc until the area 205. At 205, the shape of the surface transitions to a more gradual curve 210 so that there is a more gradually curved area 215 left between the rolled up strap 100 and the inner surface 200 of the strap. The more gradually curved area 210 includes a flat surface part 211, which extends to an area 212, are which another curved section 235 is formed, continuing until the distal end 220.

In one embodiment, the distal end 220 extends 3 to 4 inches above the top most portion 225 of the rolled up strap. The more gradual curved portion 210 causes that top portion 225 to extend backwards towards the strap by a distance of approximately 1⅞ inches. This forms an inner surface that propels the strap, including a first inner surface 211 that propels the strap almost straight upward, and a second curved surface 235 which pushes the strap forward during the act of propelling the strap.

The end extending above the top portion thus extends the length of the surface that pushes against the strap when the strap is thrown.

The portion of the strap between the front surface 240 of the strap holding part 110 and the interface portion 205 of the strap holding portion is substantially round, and hence the outer perimeter of the rolled up strap fits tightly within that portion. This extends over approximately 120° and thus contains about 120° of the strap before throwing. The open area 215 begins at the portion 205, and enables the strap to move up and press against the inner surfaces of the device while it is being propelled.

Figure 6:
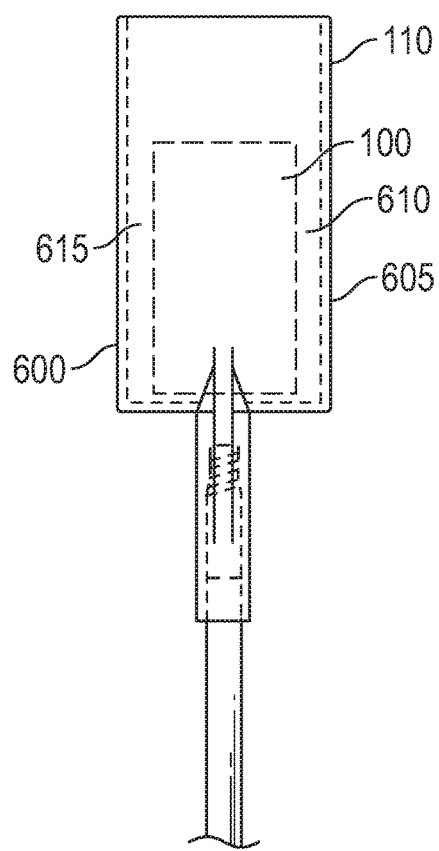
FIG. 6 shows a front view of the strap throwing part.

The strap holding portion 110 is preferably somewhat wider than the strap itself. In an embodiment, as shown in FIG. 6, rolled up strap 100 is held between sidewalls 600 605; which are separated from one another by 6 inches. This leaves 1 inch of space 610, 615 on each side of the strap between the rolled up strap and the walls 600, 605.

In this embodiment, this prevents the disk shaped roll 110 from wobbling too much during the throwing process, and making sure that the diameter axis of the cylinder stays more or less perpendicular to the direction of throwing. This produces a better throwing effect.

FIG. 2 shows how the strap part is longest at the top toward the distal end 220. It is shortest at the front. At the sides, at 255, the strap part surrounds only a little less than half of the rolled up portion 100.

Figure 7:
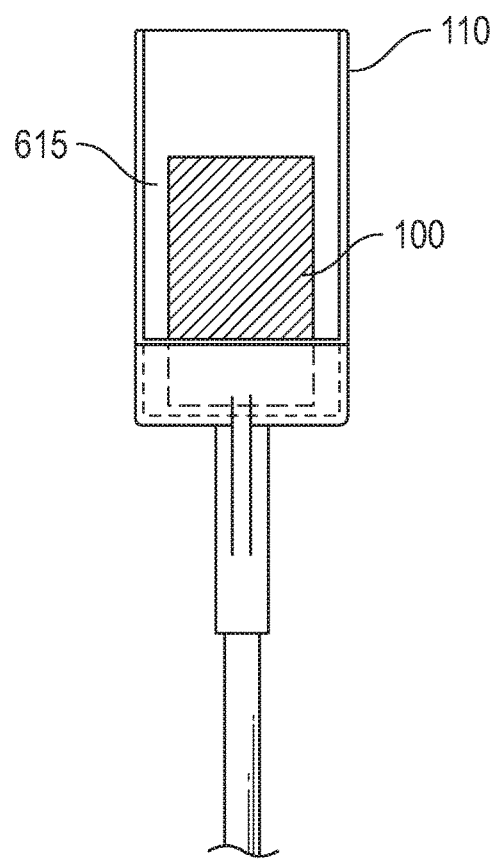
FIG. 7 shows a top view of the strap throwing part.

FIG. 7 illustrates the throwing part 110 from the top showing the strap 100, and showing the spaces 615 610 that allow the strap to be easily released from the strap throwing part however attempt to maintain the disk axis roughly in registration with the direction of throwing.

In one embodiment, the throwing surface 210 may have openings in that surface to compensate for air resistance.

Figure 3:
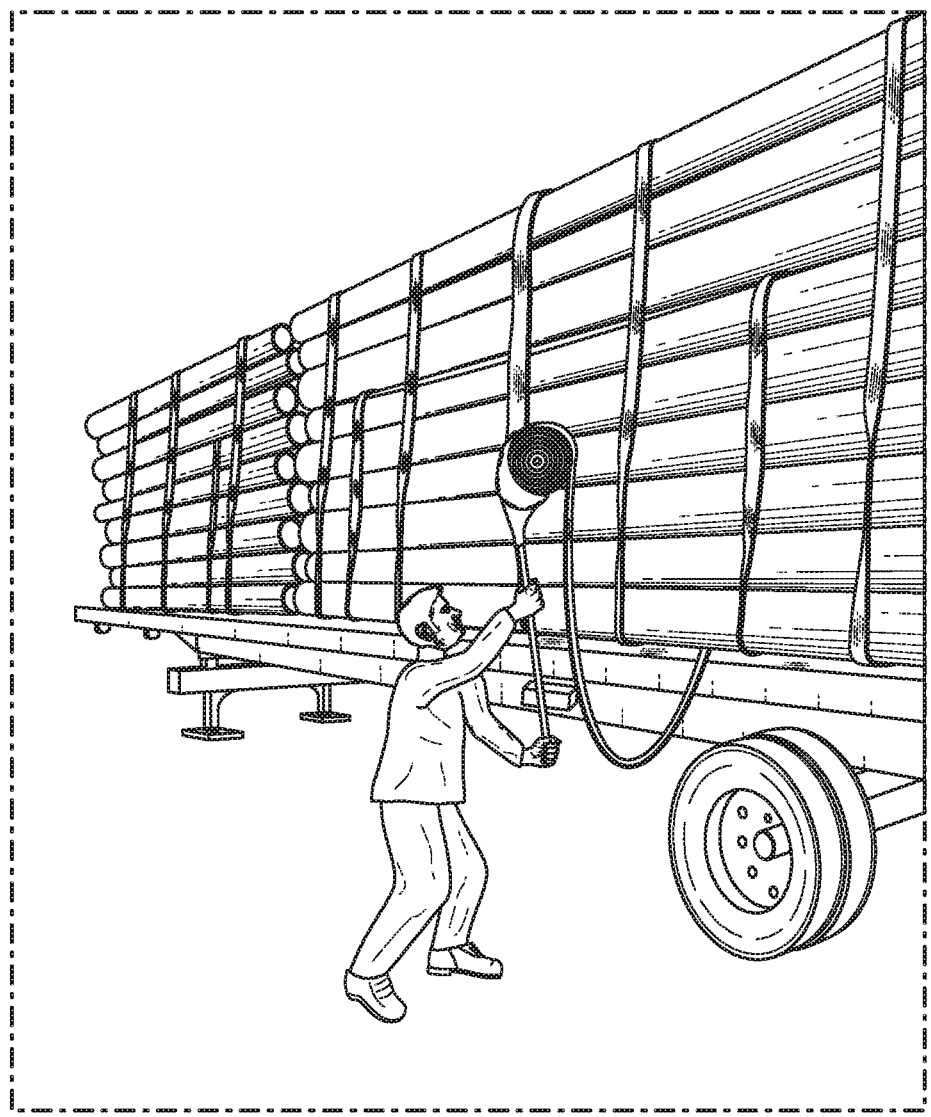
FIG. 3 shows the beginning part of throwing the strap over a load
Figure 4:
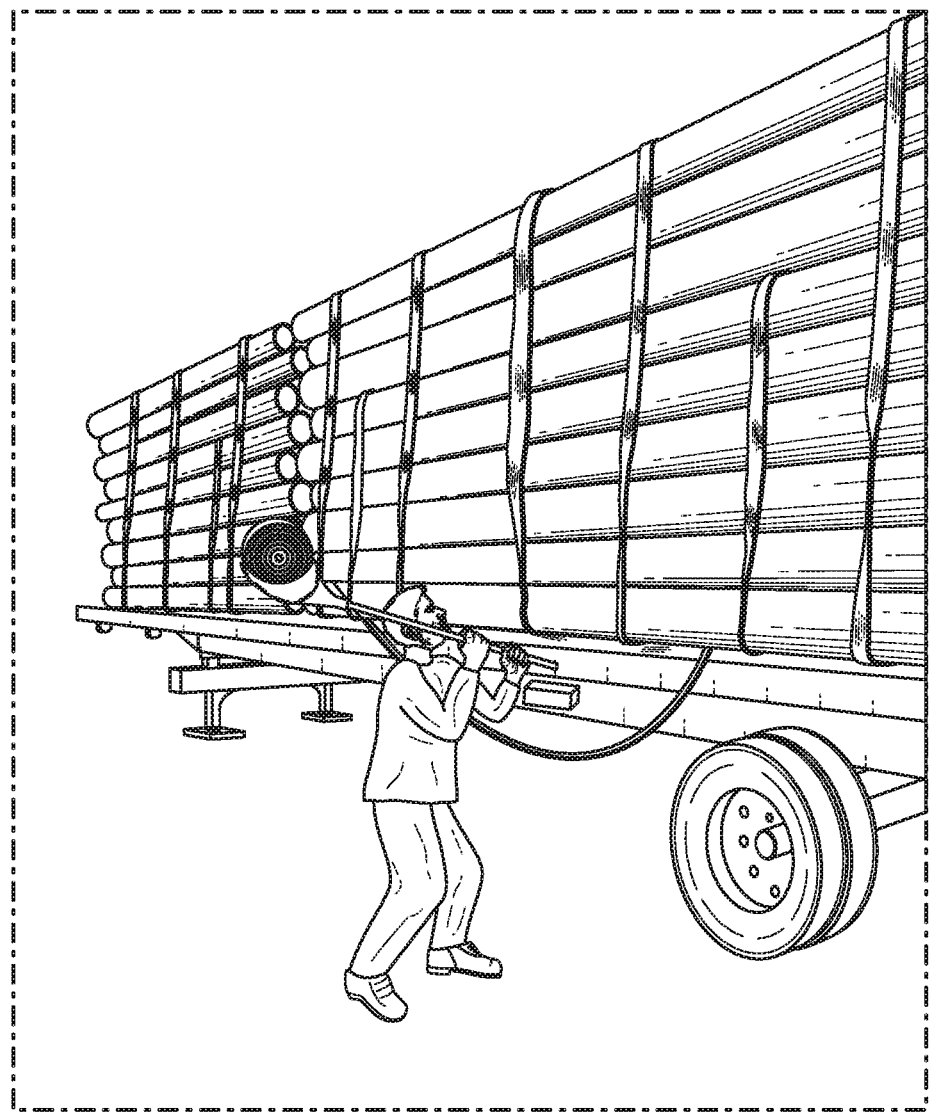
FIG. 4 shows a middle part of throwing the strap over a load
Figure 5:
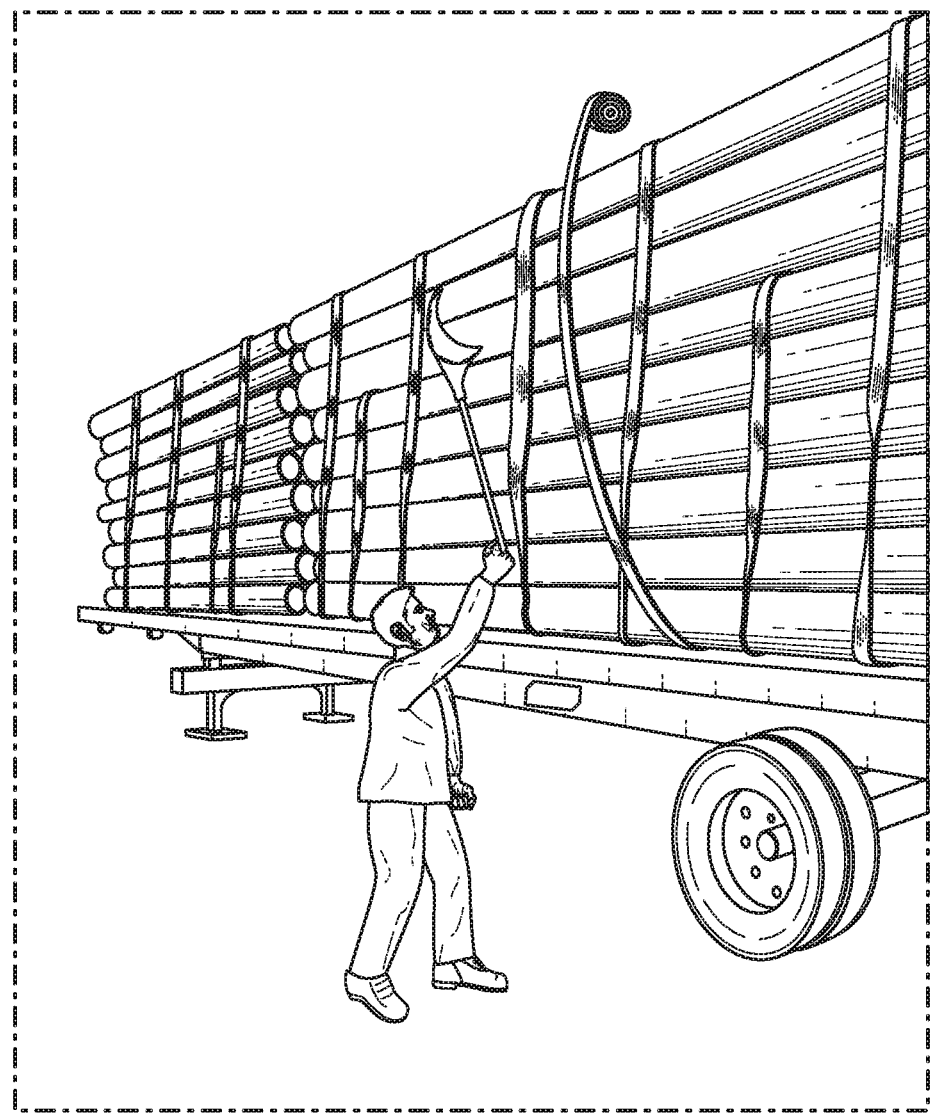
FIG. 5 shows the strap being ejected from the part and travelling over the load.

In operation, the user places the rolled strap into the part at the end of the pole, and provides a little slack as shown in FIG. 3. The user lifts the pole over the user's head as shown in FIG. 4, and then throws the rolled strap over the load as shown in FIG. 5. When the strap is thrown, the roll is lifted out of the part and pushed forward. As the roll lifts out of the part, the side surfaces 210 constrain the plane of the roll, to keep the roll traveling in a straight line as it passes over the load to be strapped.

The concentric forces from keeping the roll in place hold the roll in a straight line for as long as possible during the throw. As the roll is lifted out of the part, the roll thus stays as straight as possible.

As the roll is pushed forward, the surfaces push forward on the roll as it lifts out of the part and maximize the forces pressing the roll forward from behind the roll. At the same time, the bottom surfaces, constrain the roll in place to keep the roll straight during the throwing process, for as long a period as possible.

Once released, the rolled up strap thus travels over the load, with the momentum of the strap forcing the strap out of the strap holding part, and sailing over the load. The user then goes to the other side of the load, and fastens the other end of the strap into place on that other side.

By holding the rolled strap in the part, and allowing the rolled strap to release in a constrained way that keeps the balled-up strap in position as long as possible, this produces a mechanical advantage that facilitates delivering the strap into place.

Although only a few embodiments have been disclosed in detail above, other embodiments are possible and the inventors intend these to be encompassed within this specification. The specification describes certain technological solutions to solve the technical problems that are described expressly and inherently in this application. This disclosure describes embodiments, and the claims are intended to cover any modification or alternative or generalization of these embodiments which might be predictable to a person having ordinary skill in the art. For example, the part can be made of different materials.

Also, the inventor(s) intend that only those claims which use the words "means for" are intended to be interpreted under 35 USC 112, sixth paragraph. Moreover, no limitations from the specification are intended to be read into any claims, unless those limitations are expressly included in the claims.

Where a specific numerical value is mentioned herein, it should be considered that the value may be increased or decreased by 20%, while still staying within the teachings of the present application, unless some different range is specifically mentioned.

The previous description of the disclosed exemplary embodiments is provided to enable any person skilled in the art to make or use the present invention. Various modifications to these exemplary embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A strap holding and placement system, comprising:
a handle having a first end and a second end;
the handle adapted for being held at the first end;
a strap part, connected to the second end of the handle, the strap part defining multiple surfaces and the strap part holding a rolled strap,
the multiple surfaces including a front surface, at a front portion of the strap part, where the rolled strap is held behind the front surface, a first rounded portion, extending from the front surface, holding the rolled strap, and extending to a location behind where the rolled strap is held, the first rounded portion holding only a bottom portion of the rolled strap, and the first rounded portion extending downward and below the front surface when the handle is held vertically, so that when the rolled strap is located in the strap part and the handle is vertical, a portion of the rolled strap is below a level of the front surface,
and the multiple surfaces also including a second curved portion above the first rounded portion, the second curved portion extending above a level of a top of the rolled strap when the rolled strap is located in the strap part, and which enables the strap to be propelled from the strap part from an area near a distal end of the strap part, when the handle is moved to propel the strap,
the strap part including first and second side portions, which are spaced from side portions of the rolled strap, in a way that constrains an orientation of the rolled strap while the rolled strap is between the first and second side portions, but allows the strap to be released from the strap part when the handle is moved in the direction to throw the strap,
where the multiple surfaces maintain an orientation of the rolled strap to have an edge surface of the rolled strap facing the front surface and below the front surface while the handle is vertical and until the strap is released by being thrown.

2. The system as in claim 1, wherein the first rounded portion of the strap part contains and presses snugly against the bottom of the rolled strap, and has a flat portion above the first rounded portion, and has said second curved portion above the flat portion, and said second curved portion defining an area between the flat portion and the distal end of the strap part, which curves in a direction of throwing of the strap.

3. The system as in claim 2, wherein the distal end of the strap part extends at least three inches above a top of the rolled up strap.

4. The system as in claim 1, wherein the rolled strap is rolled into a disc-shaped roll, having a center, and the first and second side portions are spaced from areas of the rolled up strap between a center of the disc shaped roll, and a rear-most portion of the disc-shaped roll, and where the rear most portion of the disc shaped roll strap holds against a rear portion of the strap part.

5. The system as in claim 1, wherein the strap part includes a lower portion, surrounding a center and a rear portion of the rolled up strap, and following a curvature of the rolled up strap, and also includes an upper portion, attached to the lower portion, the upper portion defining a back portion for only an upper portion of the rolled up strap, and not following the curvature of the rolled up strap.

6. The system as in claim 5, wherein the strap part is longest at a distal end of the upper portion of the strap part, and is shortest at the front surface, and the first and second side portions surround only half of the rolled up portion.

* * * * *